(12) United States Patent
Li et al.

(10) Patent No.: US 9,256,554 B2
(45) Date of Patent: Feb. 9, 2016

(54) PROGRESS RECORDING METHOD AND RECOVERING METHOD FOR ENCODING OPERATION ON STORAGE DEVICE

(71) Applicant: VIA Technologies, Inc., New Taipei (TW)

(72) Inventors: Shou-Di Li, Shanghai (CN); Guang-Hui Wu, Shanghai (CN); Hai-Bin Shen, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 328 days.

(21) Appl. No.: 13/736,092

(22) Filed: Jan. 8, 2013

(65) Prior Publication Data

US 2014/0115284 A1    Apr. 24, 2014

(30) Foreign Application Priority Data

Oct. 24, 2012  (CN) .......................... 2012 1 0408643

(51) Int. Cl.
*G06F 12/00* (2006.01)
*G06F 12/16* (2006.01)
*G06F 11/14* (2006.01)

(52) U.S. Cl.
CPC ............ *G06F 12/16* (2013.01); *G06F 11/1402* (2013.01)

(58) Field of Classification Search
CPC . G06F 12/00; G06F 11/1446; G06F 11/1451; G06F 11/1461; G06F 11/1464
USPC .......................... 711/100, 154, 162, 163, 170
See application file for complete search history.

(56) References Cited

U.S. PATENT DOCUMENTS

| 6,999,587 B1 * | 2/2006 | Asano et al. .................. 380/202 |
| 2010/0083005 A1 | 4/2010 | Ito et al. |
| 2012/0173882 A1 | 7/2012 | Horn et al. |
| 2014/0006685 A1 * | 1/2014 | Peterson et al. .............. 711/102 |

FOREIGN PATENT DOCUMENTS

TW          201009581          3/2010

OTHER PUBLICATIONS

"Office Action of Taiwan Counterpart Application", issued on Jan. 21, 2015, p. 1-p. 10.

* cited by examiner

*Primary Examiner* — Tuan Thai
(74) *Attorney, Agent, or Firm* — Jianq Chyun IP Office

(57) ABSTRACT

A progress recording method and a corresponding recovering method adapted to an encoding operation performed on a storage area of a storage device are provided. The progress recording method includes the following steps. A variable set is initialized and stored. The encoding operation includes a plurality of sub-operations, and each of the sub-operations is corresponding to at least one flag variable in the variable set. The flag variables are used for recording execution progresses of the sub-operations. When each of the sub-operations is executed, the corresponding flag variable in the variable set is updated according to the execution progress of the sub-operation.

8 Claims, 6 Drawing Sheets

PROGRESS RECORDING METHOD AND RECOVERING METHOD FOR ENCODING OPERATION ON STORAGE DEVICE

CROSS-REFERENCE TO RELATED APPLICATION

This application claims the priority benefit of China application serial no. 201210408643.0, filed on Oct. 24, 2012. The entirety of the above-mentioned patent application is hereby incorporated by reference herein and made a part of this specification.

BACKGROUND OF THE INVENTION

1. Field of the Invention

The invention generally relates to a progress recording method and a recovering method, and more particularly, to a progress recording method and a recovering method adapted to an encoding operation performed on a storage device.

2. Description of Related Art

A hard disk is an essential storage device used in a computer. Hard disks are broadly adopted by notebook computers, desktop computers, and specialty servers for storing large amounts of data. Generally, a hard disk is divided into one or more storage areas (partitions or volumes), and each storage area is used for installing an operating system or storing data.

Besides the general data reading and writing operations, other encoding operations, such as encryption, decryption, re-encryption, and reverse re-encryption, can also be performed on the storage areas of a hard disk. Aforementioned encryption operation requires a corresponding password to be set. An encryption operation can convert data in a storage area from plain text to cipher text to protect the data, while a decryption operation can convert data in the storage area from cipher text back to the original plain text. To change the encryption password, aforementioned re-encryption operation first decrypts the cipher text in the storage area with the old password and then encrypts the data again with the new password. After the re-encryption operation is suspended, the reverse re-encryption operation decrypts the re-encrypted data with the new password and then encrypts it with the old password, so that the data in the storage area is restored to its state before the re-encryption.

The hard disk in a large-scale server usually stores a great mass of data. Accordingly, an encryption operation may take several days, and the possibility of contingencies (for example, power failures) may be drastically increased. If a power failure occurs during an encryption operation, data in a storage area may be damaged or lost, or the entire storage area may become inaccessible.

A conventional encoding operation sets a header in a storage area for storing an offset. Herein the offset indicates the progress of the encoding operation. The offset is updated every time after a specific amount of data (for example, data of 32 megabytes (MB) is encoded. However, such a technique cannot effectively avoid the problem of data loss caused by power failures.

FIG. 1 is a diagram illustrating an encoding operation performed on a storage area 100 of a hard disk. The header 120 of the storage area 100 stores aforementioned offset, and this offset is updated every time after data of b bytes is encoded. The encoding operation is performed from the offset S to the offset 0. Herein b and S are predetermined constants. When the encoding operation reaches the offset S-b, the offset stored in the header 120 is updated. If no contingency occurs, when the encoding operation reaches the offset S-2b, the offset stored in the header 120 is updated again. However, if a power failure occurs when the encoding operation reaches the offset p and the encoding operation is resumed from the offset S-b according to the value stored in the header 120 after the power is resupplied, data from the offset S-b to the offset p is encoded twice. Namely, the data is damaged.

SUMMARY OF THE INVENTION

Accordingly, the invention is directed to a progress recording method and a recovering method adapted to an encoding operation performed on a storage area of a storage device, in which data in the storage area and the encoding operation can be correctly restored and resumed after a contingency (for example, a power failure), so that the problems of data damage, data loss, and inaccessibility of the storage area can be avoided.

The invention provides a progress recording method adapted to an encoding operation performed on a storage area of a storage device. The progress recording method includes following steps. A variable set is initialized and stored. The encoding operation includes a plurality of sub-operations. Each of the sub-operations is corresponding to at least one flag variable in the variable set, and the flag variable is used for recording an execution progress of the sub-operation. When each of the sub-operations is executed, the corresponding flag variable in the stored variable set is updated according to the execution progress of the sub-operation.

According to an embodiment of the invention, one of the sub-operations is corresponding to a first flag variable and a second flag variable among the flag variables, and the step of updating the flag variable according to the execution progress of the sub-operation includes following sub-steps. The first flag variable is updated according to a next execution progress of the sub-operation, and herein the first flag variable is not equal to the second flag variable. The sub-operation is executed. The second flag variable is updated according to the current execution progress of the sub-operation, and herein the first flag variable is equal to the second flag variable.

According to an embodiment of the invention, the encoding operation includes a backup sub-operation, and the backup sub-operation backs up data in the storage area into another storage area different from the storage area before the sub-operation corresponding to the first flag variable and the second flag variable is executed.

The invention also provides a recovering method adapted to aforementioned encoding operation. The recovering method includes following steps. The variable set is read. Whether any one of the sub-operations of the encoding operation is interrupted is determined according to the variable set. If one of the sub-operations is interrupted, the interrupted sub-operation is recovered according to the flag variable corresponding to the interrupted sub-operation. The encoding operation is carried on according to the execution progress recorded by the flag variables in the variable set.

According to an embodiment of the invention, one of the sub-operations is corresponding to a first flag variable and a second flag variable among the flag variables, and the step of recovering the encoding operation includes following sub-steps. If the first flag variable is not equal to the second flag variable, the first flag variable is set to be equal to the second flag variable.

According to an embodiment of the invention, the encoding operation includes a backup sub-operation, the backup sub-operation backs up data in the storage area into another storage area different from the storage area before the sub-operations corresponding to the first flag variable and the second flag variable is executed, and the step of recovering the encoding operation includes following sub-steps. Data in a section of the storage area defined by the first flag variable and the second flag variable is recovered by using the backup data of the storage area.

As described above, in the invention, the execution progresses of sub-operations of an encoding operation are recorded by using flag variables corresponding to the sub-operations, and data in the storage area is backed up when it is necessary. Thereby, the encoding operation can be recovered and carried on after a contingency (for example, a power failure).

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
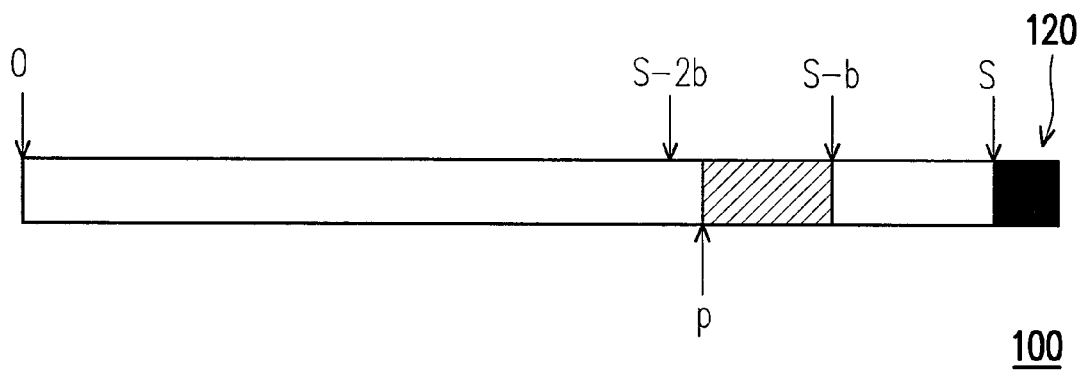
FIG. 1 is a diagram of an encryption operation performed on a storage area of a storage device according to a conventional technique.

Reference will now be made in detail to the present preferred embodiments of the invention, examples of which are illustrated in the accompanying drawings. Wherever possible, the same reference numbers are used in the drawings and the description to refer to the same or like parts.

Figure 2:
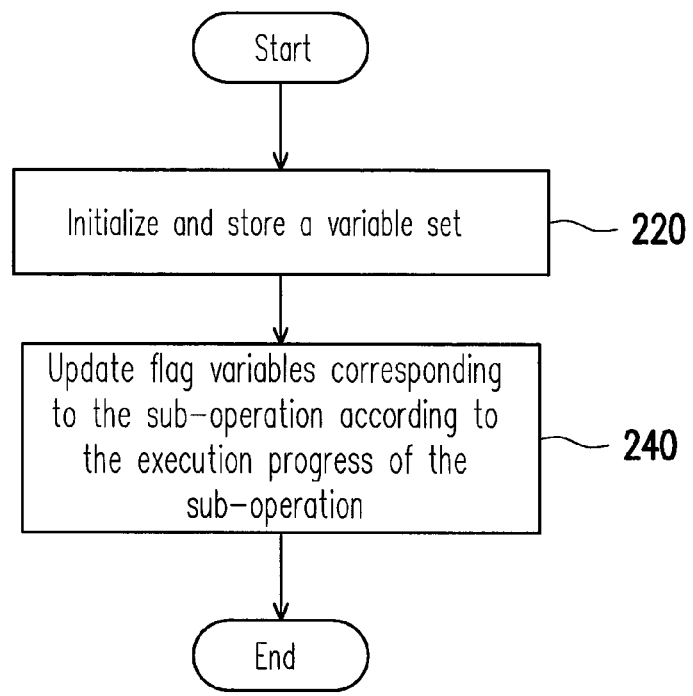
FIG. 2 is a flowchart of a progress recording method adapted to an encoding operation performed on a storage area of a storage device according to an embodiment of the invention.

FIG. 2 is a flowchart of a progress recording method adapted to an encoding operation performed on a storage area of a storage device according to an embodiment of the invention. The storage device can be any non-volatile storage device, such as a flash memory, a memory card, or a hard disk. The encoding operation can be encryption, decryption, re-encryption, or reverse re-encryption.

The encoding operation includes a plurality of sub-operations. In order to recover and carry on the encoding operation after a power failure, system failure, or human error occurs, each sub-operation is corresponded to one or more flag variables. Herein the flag variables are used for recording the execution progresses of the corresponding sub-operations. The flag variables constitute a variable set. The variable set may be stored in the storage area on which the encoding operation is performed or in another storage area different from aforementioned storage area, and the variable set may be stored as a file. The variable set may also be independent to the file system and directly stored in a specific area of the storage area on which the encoding operation is performed or a specific area of another storage area.

Below, the progress recording method will be described with reference to the flowchart in FIG. 2. In step 220, the variable set is initialized and stored. In step 240, when each sub-operation of the encoding operation is executed, the flag variable corresponding to the sub-operation in the stored variable set is updated according to the execution progress of the sub-operation. Accordingly, the variable set can reflect the execution progress of the encoding operation in real time. If a contingency occurs and the encoding operation is interrupted, the encoding operation can be recovered and further executed according to the variable set.

Figure 3:
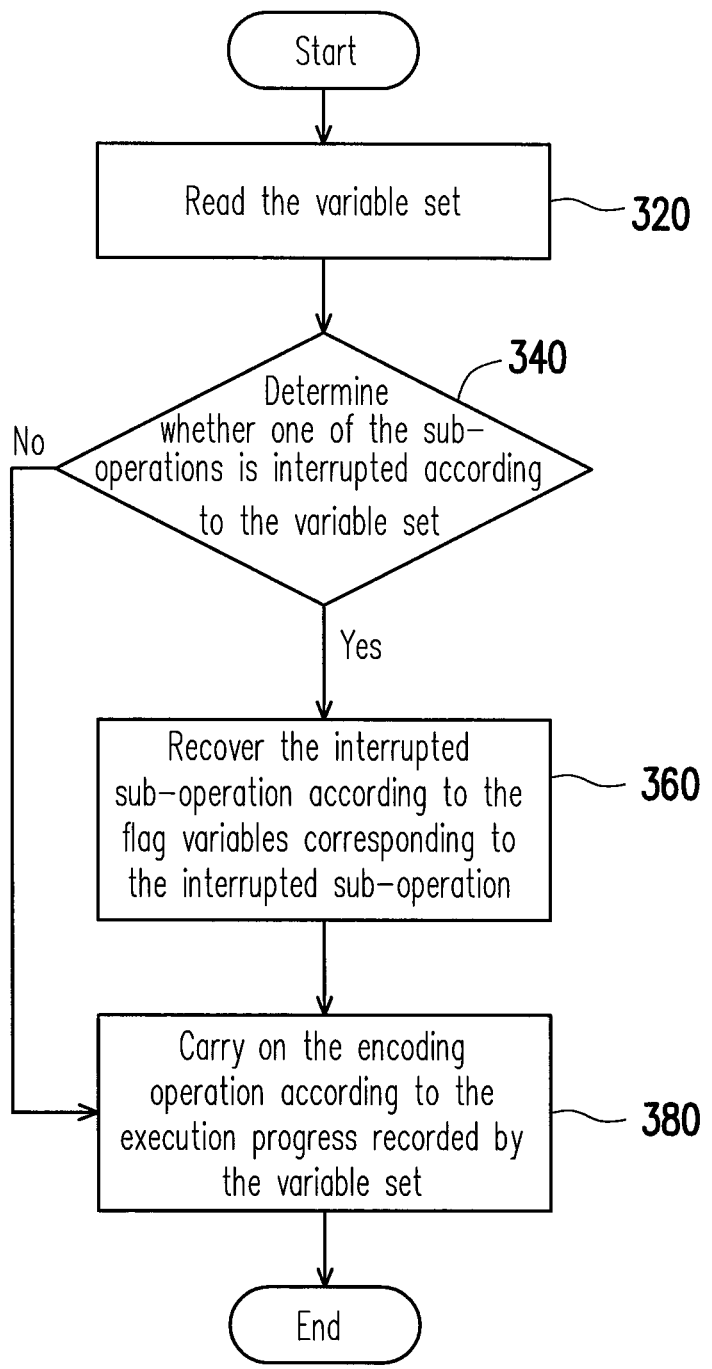
FIG. 3 is a flowchart of a recovering method adapted to an encoding operation performed on a storage area of a storage device according to an embodiment of the invention.

FIG. 3 is a flowchart of a recovering method adapted to an encoding operation performed on a storage area of a storage device according to an embodiment of the invention. The recovering method in FIG. 3 is corresponding to the progress recording method in FIG. 2, and which can be executed after the encoding operation is interrupted by a contingency (for example, a power failure). In step 320, the variable set is read. In step 340, whether any one of the sub-operations of the encoding operation is interrupted is determined according to the variable set. If a sub-operation is interrupted, in step 360, the interrupted sub-operation is recovered according to the flag variable corresponding to the interrupted sub-operation. The interruption recovering sub-operation is to recover data related to the sub-operation to the state before the sub-operation is executed or to the sate after the sub-operation is executed without any interruption. Next, in step 380, the encoding operation is carried on according to the execution progress recorded by the flag variables in the variable set. On the other hand, if it is determined in step 340 that none of the sub-operations is interrupted, the encoding operation is interrupted between two sub-operations. Accordingly, step 360 is skipped and step 380 is directly executed.

Figure 4:
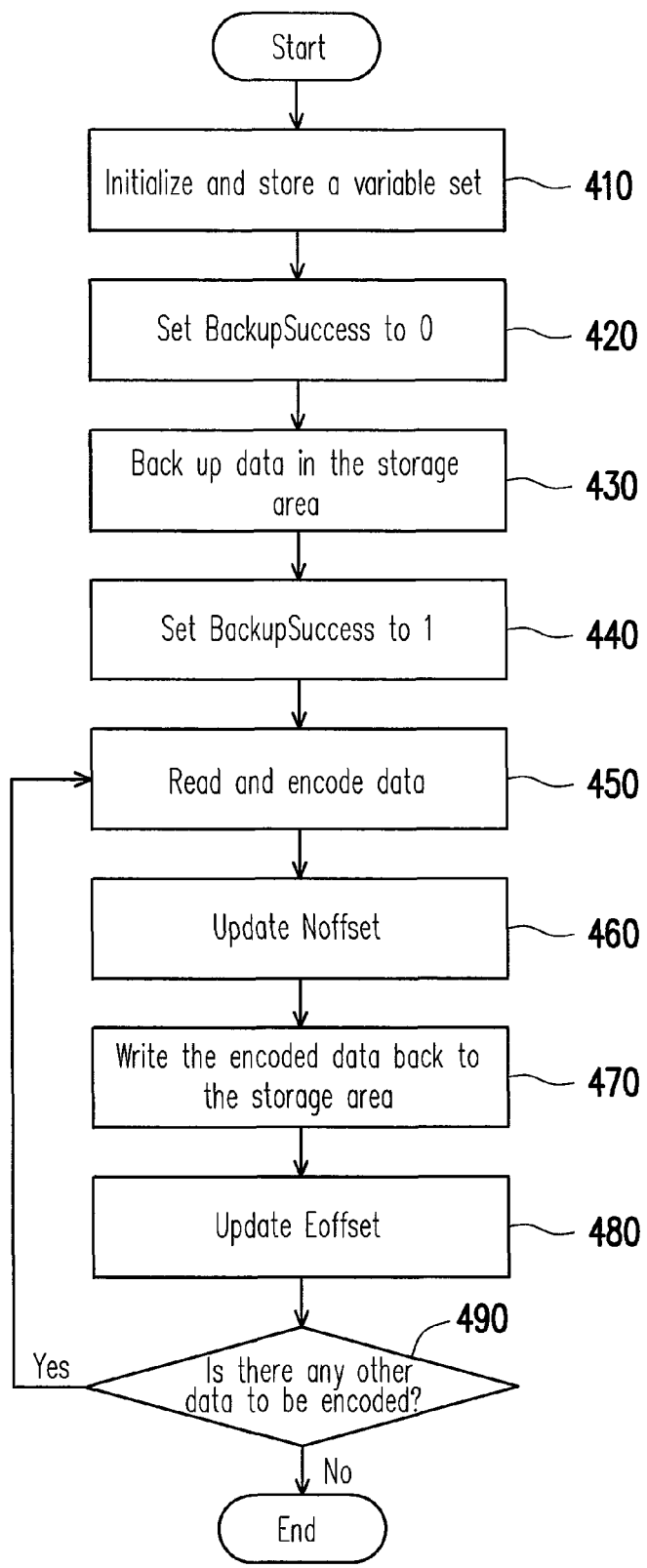
FIG. 4 is a flowchart of a progress recording method adapted to an encoding operation performed on a storage area of a storage device according to another embodiment of the invention.

FIG. 4 is a flowchart of a progress recording method adapted to an encoding operation performed on a storage area of a storage device according to another embodiment of the invention. The encoding operation in the present embodiment has two sub-operations, which are respectively backing up data in step 430 and writing the encoded data in step 470. The sub-operation of data backup in step 430 is corresponding to a flag variable BackupSuccess, and the sub-operation of writing encoded data in step 470 is corresponding to two flag variables Noffset and Eoffset.

A type of sub-operations (for example, setting initial values) among all the sub-operations of an encoding operation can be repeatedly executed. This type of sub-operations needs not to back up data. Another type of sub-operations cannot be repeatedly executed. For example, an encoding operation executed twice gives a result different from that when the encoding operation is executed only once. Such a sub-operation need to back up data first just in case any contingency occurs. The sub-operation in step 470 is the second type of sub-operations (i.e., needs to back up data).

Below, the progress recording method in FIG. 4 will be described. In step 410, a variable set is initialized and stored.

The variable set includes the flag variables BackupSuccess, Noffset, and Eoffset for recording the execution progress of the encoding operation. In step 420, the value of the flag variable BackupSuccess is set to 0. In step 430, data in the storage area to which the encoding operation is to be performed is backed up. In the present embodiment, the backup data is stored in another storage area different from the storage area for performing the encoding operation. The backup data may be stored in the another storage area as a file. Or, the backup data may be independent to the file system and directly stored in a specific area of the another storage area. Next, in step 440, the value of the flag variable BackupSuccess is set to 1. Regarding the flag variable BackupSuccess, the value 0 indicates that the corresponding sub-operation is not completed yet, and the value 1 indicates that the corresponding sub-operation is already completed. In other embodiments, foregoing values 0 and 1 may be replaced by any other two different values.

In step 450, a segment of data is read and encoded. Herein the encoding operation may be encryption, decryption, re-encryption, or reverse re-encryption. The encoding operation in step 450 is carried out in units of a, and a is a predetermined parameter, such as 2 megabytes (MB). The encoding operation in step 450 may start from the greatest or the smallest offset, and each time the data of a length a is read and encoded.

In step 460, the flag variable Noffset is updated. If the encoding sub-operation in step 450 starts from the greatest offset, the update operation is to deduct a from the flag variable Noffset to record the progress of the encoding operation after the next execution in step 470. If the encoding sub-operation in step 450 starts from the smallest offset, the update operation is to add a to the flag variable Noffset to record the progress of the encoding operation after the next execution in step 470. At this moment the flag variable Noffset is different from the flag variable Eoffset.

In step 470, the encoded data is written back into the storage area. In step 480, the flag variable Eoffset is updated. If the encoding sub-operation in step 450 starts from the greatest offset, the update operation is to deduct a from the flag variable Eoffset to record the progress of the encoding operation after the execution in step 470. If the encoding sub-operation in step 450 starts from the smallest offset, the update operation is to add a to the flag variable Eoffset to record the progress of the encoding operation after the execution in step 470. At this moment the flag variable Noffset is equal to the flag variable Eoffset.

If the encoding sub-operation in step 450 starts from greatest offset, a segment of data from the offset Noffset to the offset Noffset−a is read in step 450. If the encoding sub-operation in step 450 starts from the smallest offset, a segment of data from the offset Noffset to the offset Noffset+a is read in step 450.

Next, in step 490, whether any data in the storage area should be encoded but is not yet encoded is determined. If there is such data, step 450 is executed again. Otherwise, the procedure in FIG. 4 ends here.

Figure 5:
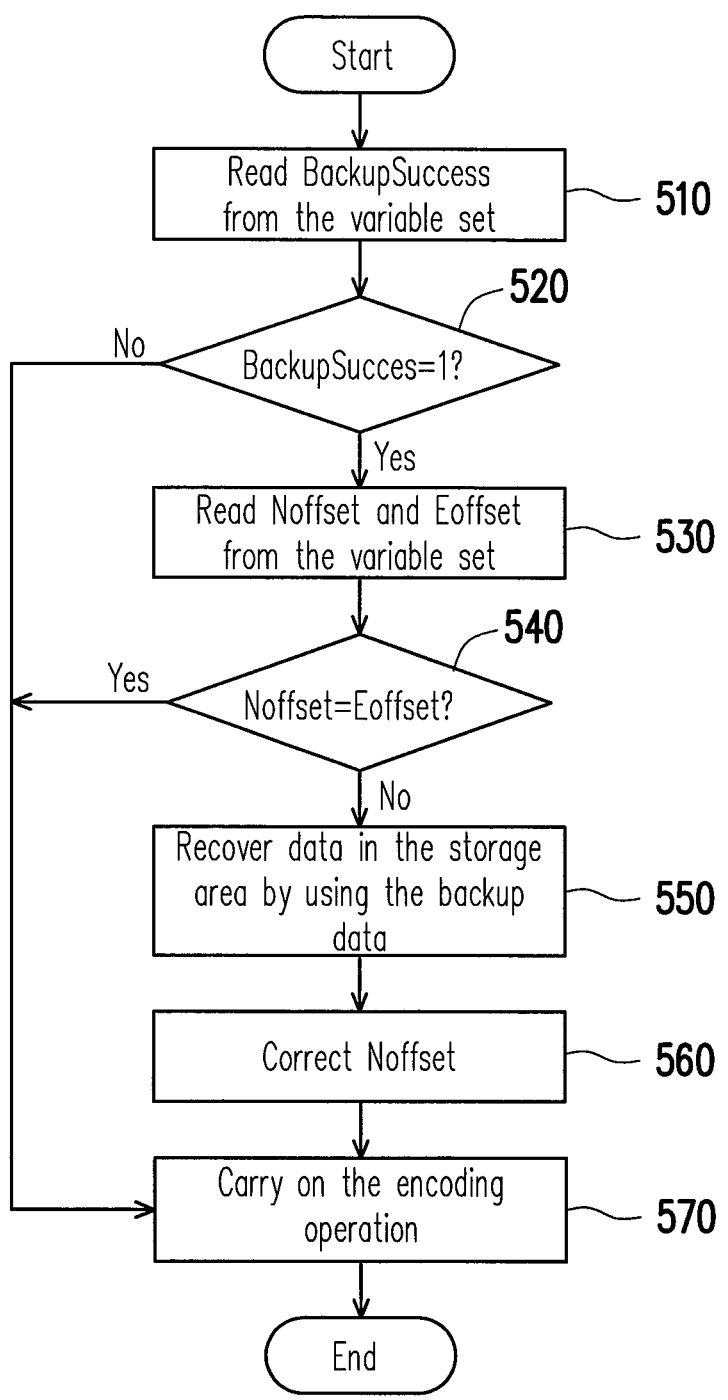
FIG. 5 is a flowchart of a recovering method adapted to an encoding operation performed on a storage area of a storage device according to another embodiment of the invention.

FIG. 5 is a flowchart of a recovering method adapted to an encoding operation performed on a storage area of a storage device according to another embodiment of the invention. The recovering method in FIG. 5 is corresponding to the progress recording method in FIG. 4, and which can be executed when the encoding operation is interrupted by a contingency (for example, a power failure).

Below, the recovering method in FIG. 5 will be described in detail. In step 510, the flag variable BackupSuccess is read from the variable set. In step 520, the value of the flag variable BackupSuccess is checked. If the value of the flag variable BackupSuccess is 1 (i.e., the sub-operation in step 430 is completed), step 530 is executed. If the value of the flag variable BackupSuccess is 0 (i.e., the sub-operation in step 430 is not completed and is interrupted), the sub-operation in step 430 needs to be recovered and the encoding operation needs to be carried on. In this case, step 570 is executed, in which the encoding operation is carried on according to the execution progress recorded by the flag variables in the variable set. Herein the encoding operation is carried on means the execution flow returns to step 410 to perform the entire encoding operation from the beginning. Because the step 430 is also re-executed, the sub-operation in step 430 is recovered.

In step 530, the flag variables Noffset and Eoffset are read from the variable set. In step 540, whether the flag variables Noffset and Eoffset are equal to each other is determined. If the flag variables Noffset and Eoffset are equal (i.e., none of the sub-operations of the encoding operation is interrupted), step 570 is executed to carry on the encoding operation according to the execution progress recorded by the flag variables in the variable set. Herein the encoding operation is carried on means the execution flow returns to step 490.

Contrarily, if the flag variables Noffset and Eoffset are not equal (i.e., the sub-operation in step 470 is not completely and is interrupted), the sub-operation in step 470 needs to be recovered and the encoding operation needs to be carried on. In this case, step 550 is executed, in which the data in a section of the storage area defined by the flag variables Noffset and Eoffset is recovered by using the backup data mentioned in step 430. Besides, in step 560, the flag variable Noffset is updated (i.e., the flag variable Noffset is set to be equal to the flag variable Eoffset). If the encoding sub-operation in step 450 starts from the greatest offset, the section defined by the flag variables Noffset and Eoffset is the data from the offset Noffset to the offset Eoffset. If the encoding sub-operation in step 450 starts from the smallest offset, the section defined by the flag variables Noffset and Eoffset is the data from the offset Eoffset to the offset Noffset. In steps 550 and 560, the sub-operation in step 470 is recovered.

Thereafter, in step 570, the encoding operation is carried on according to the execution progress recorded by the flag variables in the variable set. Herein the encoding operation is carried on means the execution flow returns to step 450.

Figure 6:
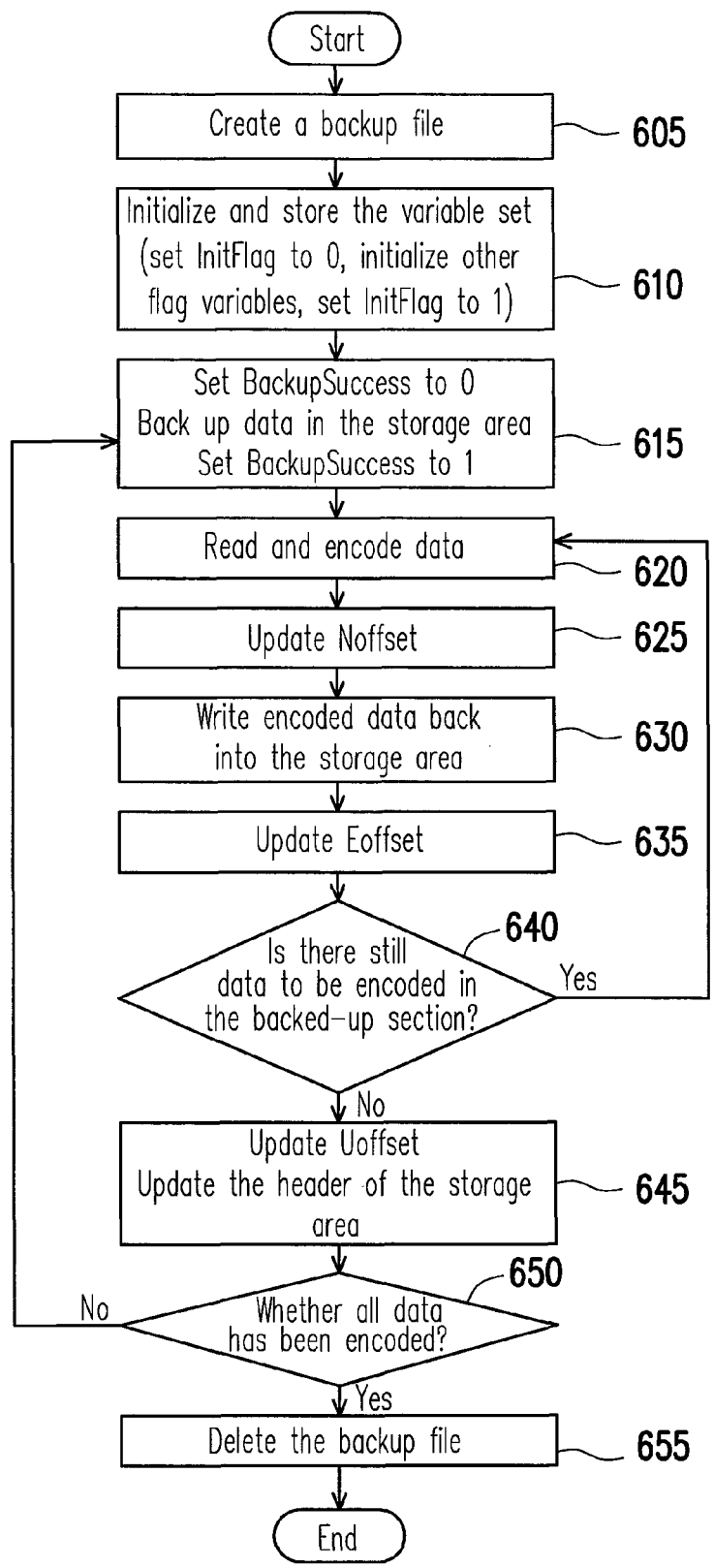
FIG. 6 is a flowchart of a progress recording method adapted to an encoding operation performed on a storage area of a storage device according to yet another embodiment of the invention.

FIG. 6 is a flowchart of a progress recording method adapted to an encoding operation performed on a storage area of a storage device according to yet another embodiment of the invention. The encoding operation in the present embodiment includes four sub-operations, which are respectively initializing a variable set in step 610, backing up data in step 615, writing the encoded data in step 630, and updating the header of the storage area in step 645. The sub-operation of variable set initialization in step 610 is corresponding to a flag variable InitFlag, the sub-operation of data backup in step 615 is corresponding to a flag variable BackupSuccess, the sub-operation of writing encoded data in step 630 is corresponding to two flag variables Noffset and Eoffset, and the sub-operation of updating the header of the storage area in step 645 is corresponding to a flag variable Uoffset.

In the progress recording method of the present embodiment, a backup file is created in a storage area different from the storage area for performing the encoding operation. After that, the variable set and the backup data are stored in the backup file. The format of the backup file is shown in following table 1.

TABLE 1

Backup File Format

VolumePath
OperationType
OperationDirection
InitFlag
BackupSuccess
Noffset
Eoffset
Uoffset
BackupLength
BackupData In foregoing table 1, BackupData is the backup data in step 615. BackupLength is the length of the data backed up every time when step 615 is executed. In the present embodiment, BackupLength is a predetermined parameter, and which may be 32 MB. VolumePath is the path of the storage area for performing the encoding operation in the file system. OperationType is the type of the encoding operation, such as encryption, decryption, re-encryption, or reverse re-encryption. OperationDirection is the direction of the encoding operation, such as from the greatest offset to the smallest offset or from the smallest offset to the greatest offset. Because the VolumePath, OperationType, and OperationDirection in the present embodiment are optional but not predetermined, they need to be stored in the backup file. All parts of foregoing table 1 except BackupData belong to the variable set.

Below, the progress recording method in FIG. 6 will be described in detail. In step 605, a backup file as shown in table 1 is created in the other storage area mentioned above. In step 610, the variable set is initialized and stored in the backup file. To be specific, in step 610, the flag variable InitFlag in the variable set is set to 0, the other flag variables are initialized, and after the variable set is stored, the flag variable InitFlag is set to 1. Regarding the flag variable InitFlag, the value 0 indicates that the initialization and storage of the variable set is not completed yet, and the value 1 indicates that the initialization and storage of the variable set is completed. In other embodiments, the values 0 and 1 can be replaced by any other two different values.

Step 615 is similar to the steps 420, 430, and 440 in FIG. 4, and the difference is that in steps 420, 430, and 440 of FIG. 4, data is backed up all at once, while in step 615, each time data of a specific length (i.e., the predetermined parameter b) is backed up. Following steps 620-635 are the same as steps 450-480 in FIG. 4 therefore will not be described herein. Thereafter, in step 640, whether there is still data to be encoded in the section backed up in step 615 is determined. If so, step 620 is executed again. Otherwise, step 645 is executed.

Next, in step 645, the flag variable Uoffset already stored in the backup file is updated, and then a progress variable Toffset stored in the header of the storage area on which the encoding operation is performed is updated to be equal to the flag variable Uoffset. The flag variable Uoffset is used for recording the progress of the data backup sub-operation in step 615. If the data backup in step 615 starts from the greatest offset, the update sub-operation in step 645 is to deduct the predetermined parameter b from the flag variable Uoffset. If the data backup in step 615 starts from the smallest offset, the update sub-operation in step 645 is to add the predetermined parameter b to the flag variable Uoffset. The progress variable Toffset stored in the header can be used as a recovery reference after a contingency occurs.

Next, in step 650, whether all data is encoded is determined. If there is still data to be encoded, step 615 is executed again. Otherwise, step 655 is executed, in which the backup file (i.e., the stored variable set and all the backup data) is deleted.

Figure 7:
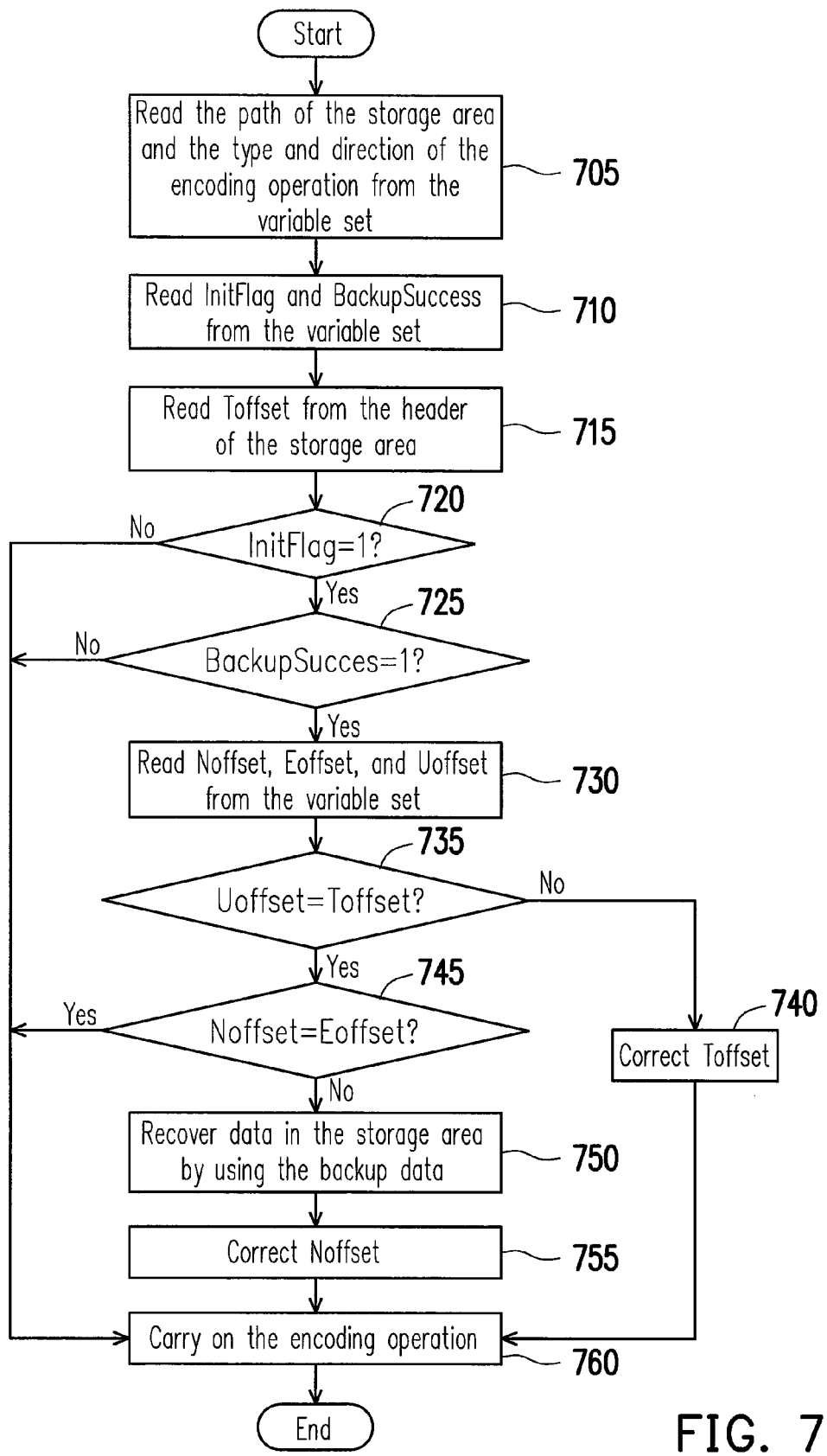
FIG. 7 is a flowchart of a recovering method adapted to an encoding operation performed on a storage area of a storage device according to yet another embodiment of the invention.

FIG. 7 is a flowchart of a recovering method adapted to an encoding operation performed on a storage area of a storage device according to yet another embodiment of the invention. The recovering method in FIG. 7 is corresponding to the progress recording method in FIG. 6.

Because the backup file is deleted at the end of the procedure illustrated in FIG. 6, after a contingency (for example, a power failure) occurs and the computer system using the storage device is re-started, whether the recovering method in the present embodiment is to be executed is determined according to the existence of the backup file. If the backup file exists (i.e., the encoding operation is interrupted by a contingency), the recovering method in the present embodiment is executed. If the backup file does not exist (i.e., the encoding operation is completed), the recovering method in the present embodiment is not executed.

Below, the recovering method in FIG. 7 will be described in detail. In step 705, the path of the storage area and the type and direction of the encoding operation are read from the variable set in the backup file, such that subsequent steps of the recovering method can be executed and the encoding operation can be continued. In step 710, the flag variables InitFlag and BackupSuccess are read from the variable set. In step 715, the progress variable Toffset is read from the header of the storage area.

In step 720, the value of the flag variable InitFlag is checked. If the value of the flag variable InitFlag is 1 (i.e., the initialization sub-operation in step 610 is completed), step 725 is executed. If the value of the flag variable InitFlag is 0 (i.e., the initialization sub-operation in step 610 is not completed and is interrupted), the sub-operation in step 610 needs to be recovered and the encoding operation needs to be carried on. In this case, step 760 is executed, in which the encoding operation is carried on according to the execution progress recorded by the flag variables in the variable set. Herein the encoding operation is carried on means that the execution flow returns to step 610 so that the initialization sub-operation in step 610 can be recovered.

Thereafter, in step 725, the value of the flag variable BackupSuccess is checked. If the value of the flag variable BackupSuccess is 1 (i.e., the backup sub-operation in step 615 is completed), step 730 is executed. If the value of the flag variable BackupSuccess is 0 (i.e., the backup sub-operation in step 615 is not completed and is interrupted), the sub-operation in step 615 needs to be recovered and the encoding operation needs to be carried on. In this case, step 760 is executed, in which the encoding operation is carried on according to the execution progress recorded by the flag variables in the variable set. Herein the encoding operation is carried on means the execution flow returns to step 615 so that the backup sub-operation in step 615 can be recovered.

Next, in step 730, the flag variables Noffset, Eoffset, and Uoffset are read from the variable set. In step 735, whether the flag variable Uoffset is equal to the flag variable Toffset is determined. If the two flag variables are equal, step 745 is executed. If the two flag variables are not equal (i.e., the sub-operation in step 645 is not completed and is interrupted), the sub-operation in step 645 needs to be recovered and the encoding operation needs to be carried on. In this case, step 740 is executed, in which the flag variable Toffset is updated. Namely, both the progress variable Toffset read in step 715 and the progress variable Toffset stored in the header are set to be equal to the flag variable Uoffset. In step 740, the sub-operation in step 645 is recovered. After that, in step 760, the encoding operation is carried on according to the execution progress recorded by the flag variables in the variable set. Herein the encoding operation is carried on means that the execution flow returns to step 650.

Thereafter, in step 735, whether the flag variable Noffset is equal to the flag variable Eoffset is determined. If the two flag variables are equal (i.e., none of the sub-operations of the encoding operation is interrupted), step 760 is executed, in which the encoding operation is carried on according to the execution progress recorded by the flag variables in the variable set. Herein the encoding operation is carried on means that the execution flow returns to step 640.

Contrarily, if the flag variables Noffset and Eoffset are not equal (i.e., the sub-operation in step 630 is not completed and is interrupted), the sub-operation in step 630 needs to be recovered and the encoding operation needs to be carried on. In this case, steps 750 and 755 are executed to recover the sub-operation in step 630. The steps 750 and 755 are the same as the steps 550 and 560 in FIG. 5 therefore will not be described herein. After that, in step 760, the encoding operation is carried on according to the execution progress recorded by the flag variables in the variable set. Herein the encoding operation is carried on means that the execution flow returns to step 620.

As described above, in the invention, the execution progresses of sub-operations of an encoding operation are recorded by using flag variables corresponding to the sub-operations, and data in the storage area is backed up when it is necessary. Thereby, the encoding operation can be recovered and carried on after a contingency (for example, a power failure). The invention provides an effective protection mechanism for data stored in the storage device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A progress recording method, adapted to an encoding operation performed on a storage area of a storage device, the progress recording method comprising:
   initializing and storing a variable set, wherein the encoding operation comprises a plurality of sub-operations, each of the sub-operations is corresponding to at least one flag variable in the variable set, and the flag variables are used for recording execution progresses of the sub-operations; and
   when each of the sub-operations is executed, updating the at least one flag variable corresponding to the sub-operation in the stored variable set according to the execution progress of the sub-operation.

2. The progress recording method according to claim 1, wherein the variable set further comprises a path of the storage area and a type and a direction of the encoding operation, and the type of the encoding operation is encryption, decryption, re-encryption, or reverse re-encryption.

3. The progress recording method according to claim 1, wherein the variable set is stored in the storage area or another storage area different from the storage area.

4. The progress recording method according to claim 1, wherein one of the sub-operations is corresponding to one of the flag variables, and the step of updating the stored flag variable according to the execution progress of the sub-operation comprises:
   setting the one flag variable to a first value;
   executing the sub-operation; and
   setting the one flag variable to a second value.

5. The progress recording method according to claim 1, wherein one of the sub-operations is corresponding to one of the flag variables, the sub-operation is updating a progress variable stored in the storage area, and the step of updating the stored flag variable according to the execution progress of the sub-operation comprises:
   before updating the progress variable, setting the flag variable to a value with which the sub-operation is going to update the progress variable.

6. The progress recording method according to claim 1, wherein one of the sub-operations is corresponding to a first flag variable and a second flag variable among the flag variables, and the step of updating the stored flag variables according to the execution progress of the sub-operation comprises:
   updating the first flag variable according to a next execution progress of the sub-operation, and then the first flag variable being not equal to the second flag variable;
   executing the sub-operation; and
   updating the second flag variable according to the current execution progress of the sub-operation, and then the first flag variable being equal to the second flag variable.

7. The progress recording method according to claim 6, wherein the encoding operation comprises a backup sub-operation, and the backup sub-operation backs up data in the storage area into another storage area different from the storage area before the sub-operation corresponding to the first flag variable and the second flag variable is executed.

8. The progress recording method according to claim 7, further comprising:
   after the encoding operation is completed, deleting the stored variable set and the backup data of the storage area.

* * * * *